United States Patent [19]

Kubo

[11] Patent Number: 4,617,739
[45] Date of Patent: Oct. 21, 1986

[54] LEAD DEVICE FOR DRAWING MACHINE

[76] Inventor: Akio Kubo, 655 Yamanouchi, Kamakura shi Kanagawaken, Japan

[21] Appl. No.: 690,793

[22] Filed: Jan. 10, 1985

[30] Foreign Application Priority Data

Jan. 12, 1984 [JP] Japan ................................ 59-3220[U]
Jan. 12, 1984 [JP] Japan ................................ 59-3221[U]
Jan. 12, 1984 [JP] Japan ................................ 59-3222[U]
Jan. 12, 1984 [JP] Japan ................................ 59-3223[U]
Jan. 27, 1984 [JP] Japan ................................... 59-13795

[51] Int. Cl.⁴ ............................................. G01D 15/24
[52] U.S. Cl. ................................... 33/18.1; 346/139 C
[58] Field of Search .................... 33/18 R; 346/139 R, 346/139 C; 401/55

[56] References Cited

U.S. PATENT DOCUMENTS 3,754,282  8/1973  Morse .......................... 346/139 C X
3,971,036  7/1976  Gerber et al. ..................... 346/139 C
4,423,428 12/1983  Kuwabara ....................... 33/18 R X Primary Examiner—Harry N. Haroian
Attorney, Agent, or Firm—Donald D. Mon; David O'Reilly

[57] ABSTRACT

A lead device for a drawing machine in which bars of lead are inserted in longitudinal recesses or bores in a turret drum. Each lead bar is driven by a wire at its upper end so as to project its lower end for writing. The turret is also pushed downward to project the lower end of the lead through a bore provided in a bottom plate on the machine by a press device associated with the lead bar pushing device through a friction force.

13 Claims, 15 Drawing Figures

F I G. 12
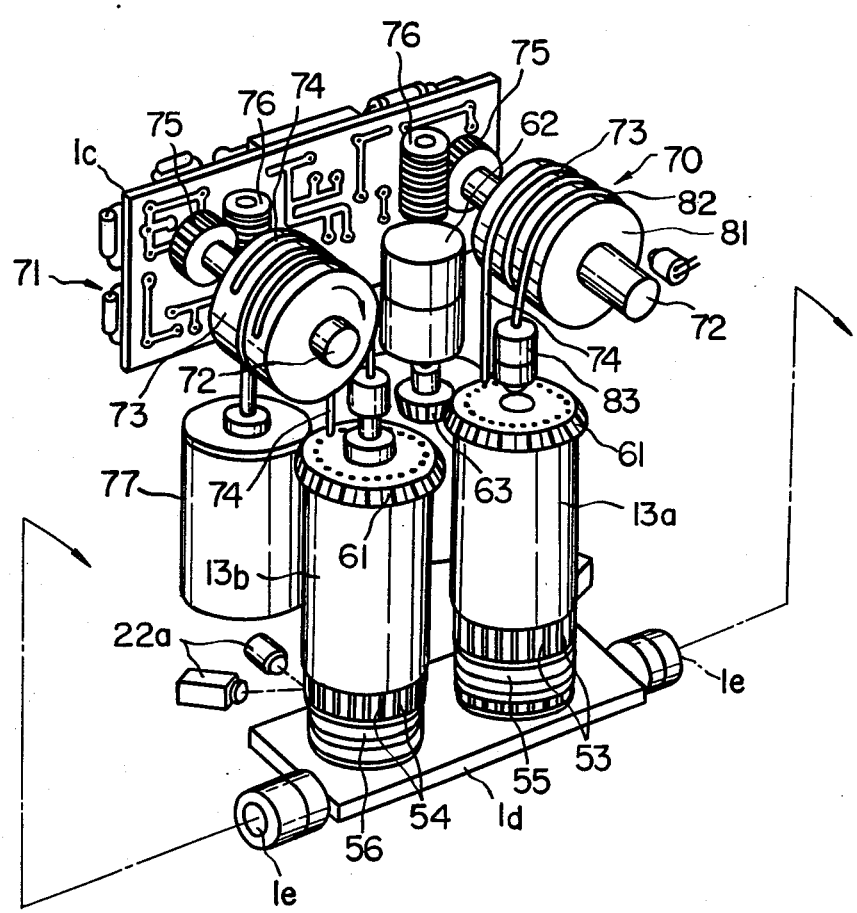

LEAD DEVICE FOR DRAWING MACHINE

FIELD OF INVENTION

This invention relates to a lead device for a drawing machine such as an XY plotter, printer for a computer word processer etc.

Heretofore, lead bars contained a turret drum driven by a rigid bar which is actuated by a carriage fixed on a belt or string because of their long stroke. However, this arrangement makes the size of device large and lengthy. Moreover the action of the string or belt is inaccurate because of stretching or elongation of the string or belt.

In a conventional lead feeding device, a lead bar is inserted in slidable holder sleeve and the holder devices are inserted in a rotating drum. Therefore, the construction is complicated, requiring small friction rings made of rubber provided in each holder sleeve for securing each lead bar in the holder sleeve. But friction rings are expensive because of their small size and the assembling step required for installing the small friction ring in each holder sleeve is a troublesome job and also expensive.

When each lead bar is worn out and a change to a new lead bar is necessary, the drum must move upwardly for drawing the lower end of bar of lead from the bore in the bottom plate and an actuating mechanism is needed such as a plunger, magnetic actuating mechanism or piston cylinder.

BACKGROUND OF THE INVENTION

The primary object of this invention is to provide an improved mechanism for driving the lead bar in a turret drum.

The secondary object of the invention is to provide a simple and economical turret drum for lead bars without using a holder device and small rubber rings.

A third object of this invention is to provide a simple mechanism for actuating the turret drum upwardly for withdrawing the lower end of a worn out lead bar.

The above and other features of the invention will be more fully understood from the following detailed description and the accompanying drawings, in which:

BRIEF DESCRIPTION OF THE DRAWINGS

FIG. 12 is a perspective view of the device shown in FIG. 8.

DETAILED DESCRIPTION OF THE INVENTION

Figure 1A:
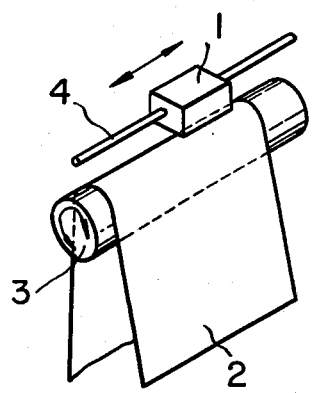
FIGS. 1 a,b show perspective view of a drawing machine having a lead device according to this invention.
Figure 1B:
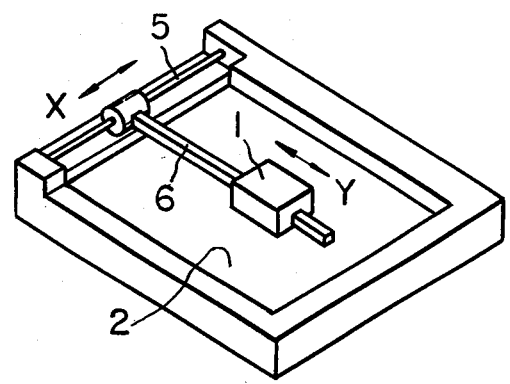

FIG. 1a,b show a drawing machine for utilizing this invention. Device 1 according to this invention is slidably or reciprocally mounted on shaft or rail 4 in an axial direction. Shaft or rail 4 is fixed adjacent to roller 3 on which paper 2 is wound. Roller 3 swings or rotates clockwise or counter clockwise. FIG. 1b shows device 1 according to this invention positioned above paper 2 moving reciprocally in the X direction on rail 5 and in the Y direction on rail 6.

A device according to this invention may be supported by a pair of connected arms or levers (not shown) which articulate to move to any desired position on the paper.

Figure 2:
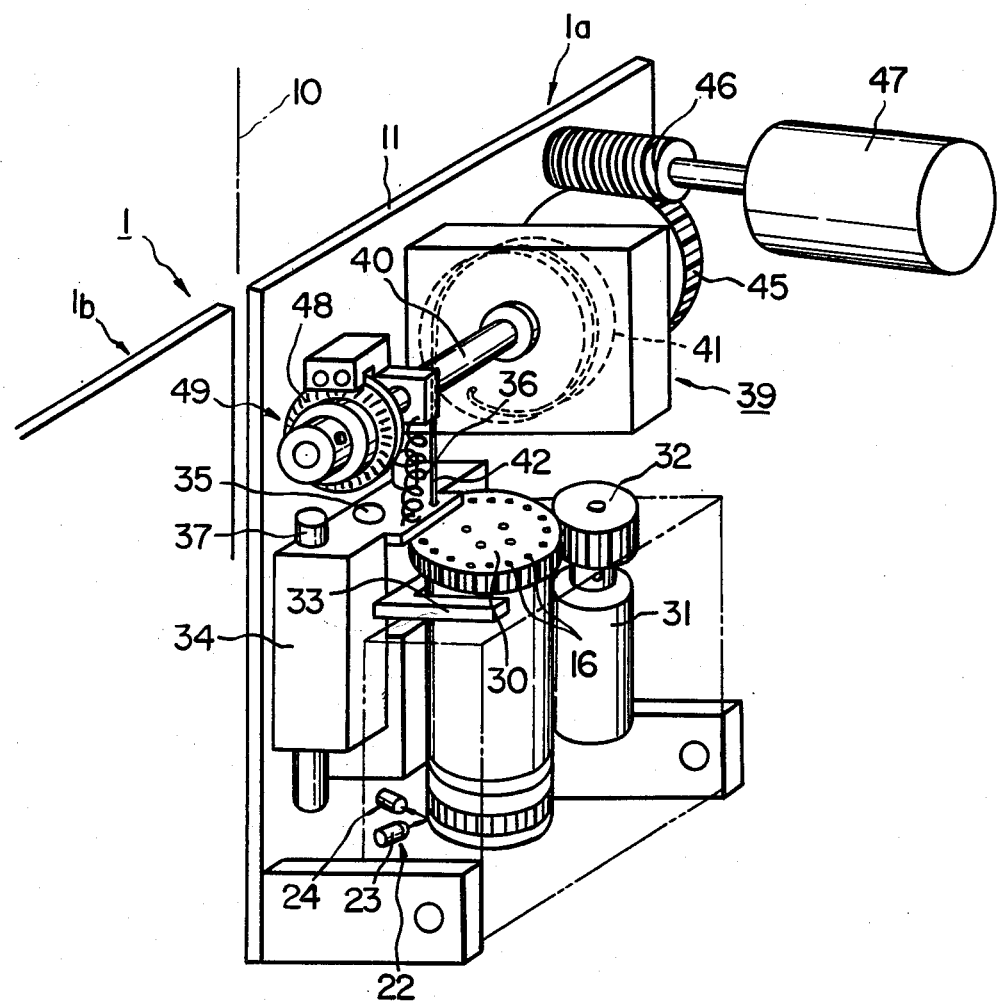
FIG. 2 is a perspective view of an embodiment of the lead device according to this invention.

As shown in FIG. 2, device 1 according to this invention consists of a pair of symmetric mechanisms 1a, 1b about axis 10. Mechanism 1a is used for a lead bar of approximately 0.3 mm thickness. Except for the thickness of the lead bars, mechanisms 1a and 1b are quite the same so only mechanism 1a will be described in detail hereafter.

Figure 3:
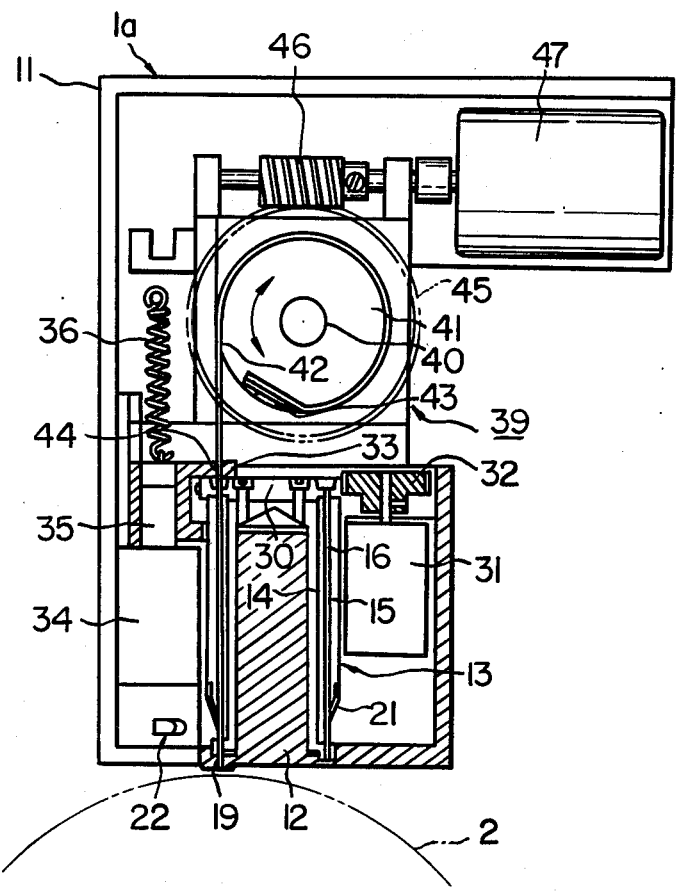
FIG. 3 is a sectional view along a vertical plane of the device shown in FIG. 2.

As shown in FIGS. 2 and 3 on the bottom plate of casing 11, shaft 12 is vertically positioned and turret drum 13 is rotatably and slidably up and down mounted on shaft 12.

Figure 4:
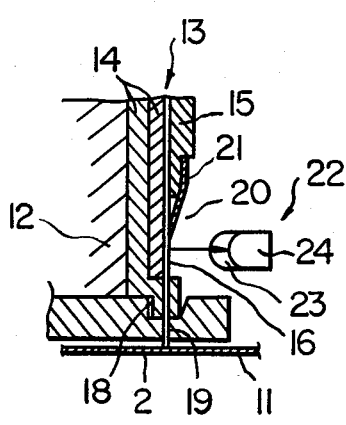
FIG. 4 is a sectional view of the lower part of the turret drum in this device.
Figure 5:
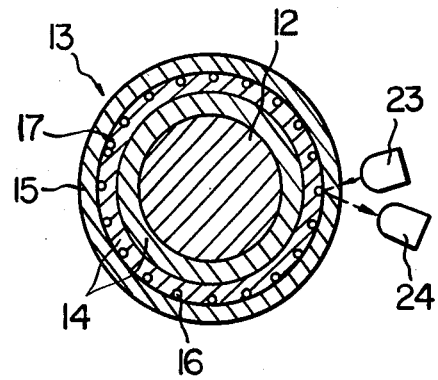
FIG. 5 is a sectional view of the drum along a horizontal plane.

As shown in FIGS. 4 and 5 the turret drum 13 consists of inner sleeves 14 and outer sleeve 15, outer peripheral face of inner sleeve 14 has twenty longitudinal recesses 17,17, . . . in equally angular spaced relation for inserting lead bars 16, 16, . . . Lead bars 16, 16, . . . are received between inner sleeve 14 and outer sleeve 15 which are slidable up and down. As shown in FIG. 4, the lower end of the inner sleeve 14 is inserted into annular recess 18 provided at the bottom of plate of casing 11. Bore 19 is provided at the bottom of annular recess 18 for projecting the lower end of lead bar 16 toward paper 2. The lower part of outer sleeve 15 is partially removed at 20 to expose lead bar 16 and a conically shaped band 21 is wound on the removed part 20 so as to frictionally hold lead bars 16,16 . . . Sensor 22 comprised of light emitting diode 23 and photoconductor 24 are provided in the vicinity of removed part 20 for detecting one of lead bars 16 when just above bore 19.

Gear 30 fixed at the upper part of turret drum 13 is connected to motor 31 through gear 32. Motor 31 is controlled by a signal from said sensor 22.

As shown in FIGS. 2 and 3, fork 33 connected to the sleeve of said turret drum 13 for imparting only vertical motion is connected to plunger 35 of solenoid coil 34. Fork 33 and plunger 35 are biased upwardly by the force of spring 36. The stroke of plunger 35 is longer than the length of said bore 19. Sensor 37 detects the upper position of plunger 35.

Lead bar press device 39 is provided above turret drum 13. In lead bar press device 39, rotary disc 41 is supported rotatably about shaft 40, wire 42 for pressing the lead bar 16 is wound around the periphery of disc 41, and end of wire 42 is fixed on disc 41 by fastener 43.

The other end of wire 42 is inserted into hole 44 provided on fork 33, in opposing relationship to the upper end of a lead bar 16.

Rotary disc 41 is connected to motor 47 through worm driven wheel 45 and worm gear 46. Calibration measuring disc 48 of rotary encoder 49 is secured on said shaft 40 and motor 47 is controlled by the output signal of encoder 49.

The operation of the above explained device is as follows: At first, turret drum 13 rotates about shaft 12 by motor 31 through gears 32, 30. Thus, when a lead bar 16 is positioned just above bore 19, sensor 22 detects a lead bar 16, photo conductor 24 generates a signal, which stops motor 31.

Then current flows through said solenoid coil 34, plunger 35, fork 33 and to lower turret drum 13 against the resilient force of spring 36 and the lower end of inner sleeve 14 is inserted into said annular groove 18.

Then motor 47 rotates worm gear 46 and worm driven wheel 45, rotary disc 41 rotates in a counter clockwise direction as shown in FIGS. 2 and 3 wire 42 lowers to push the upper end of a lead bar 16. Thus the lower end of pushed lead bar 16 is inserted into bore 19 and projects beyond the bottom plane of casing 11 into contact with paper 2 for describing a figure or character. According to the amount of wear of lead bars 16, motor 47 rotates a small amount and wire 42 is further drawn out of rotary disc 41 to press on a lead bar 16 by an additional small amount.

Thus the complete effective length of a lead bar 16 is used until rotary disc 41 and wire 42 can not move further. Motor 47 and rotary disc 41 then rotate in a reverse direction by a signal from encoder 49 and wire 42 is completely wound on the rotary disc 41. Then the electric current in solenoid coil 34 stops, and plunger 35, fork 33 and turret drum 13 rise by the resilient force of spring 36. By this movement, the lower end of a lead bar 16 is retracted from bore 19. Turret drum 13 is then rotated by motor 31 and a new lead bar 16 is positioned just above bore 19. At this time motor 31 and turret drum 13 stop.

Then current flows through said solenoid coil 34 and the same operation explained hereinbefore is repeated, and a new lead bar 16 is used to write.

Figure 6:
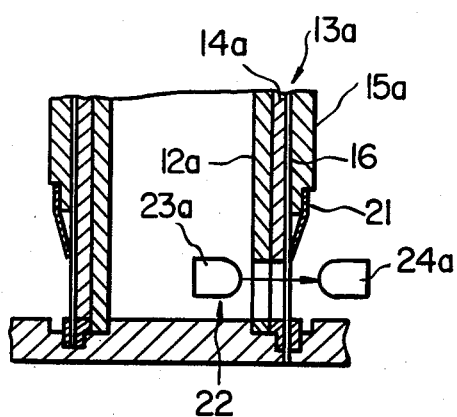
FIG. 6 is a sectional view of the lower part of a turret drum illustrating another embodiment of this invention.
Figure 7:
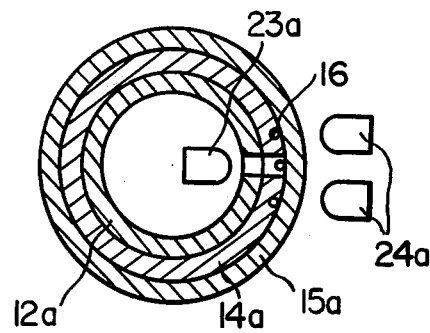
FIG. 7 is a sectional view of the drum along a horizontal plane of the device shown in FIG. 6.

In the above mentioned embodiment, a lead bar 16 is detected by sensor 22 detecting reflected light, it is possible to detect by sensor 22a detecting transmitted light when the turret drum is made of a transparent material or inner sleeve 14a has a through hole as shown in FIGS. 6 and 7. In this case shaft 12a has a hollow cavity and light emitting diode 23a is provided in the cavity, photoconductors 24a are provided outside of shaft 12a.

As explained before, the wire for pressing the lead bars are wound on a rotary disc so that the height of the device is constructed to be small and operations are accurate.

FIGS. 8 to 13 show another embodiment of the invention, in which the actuating mechanism of the turret drum is improved.

Figure 8:
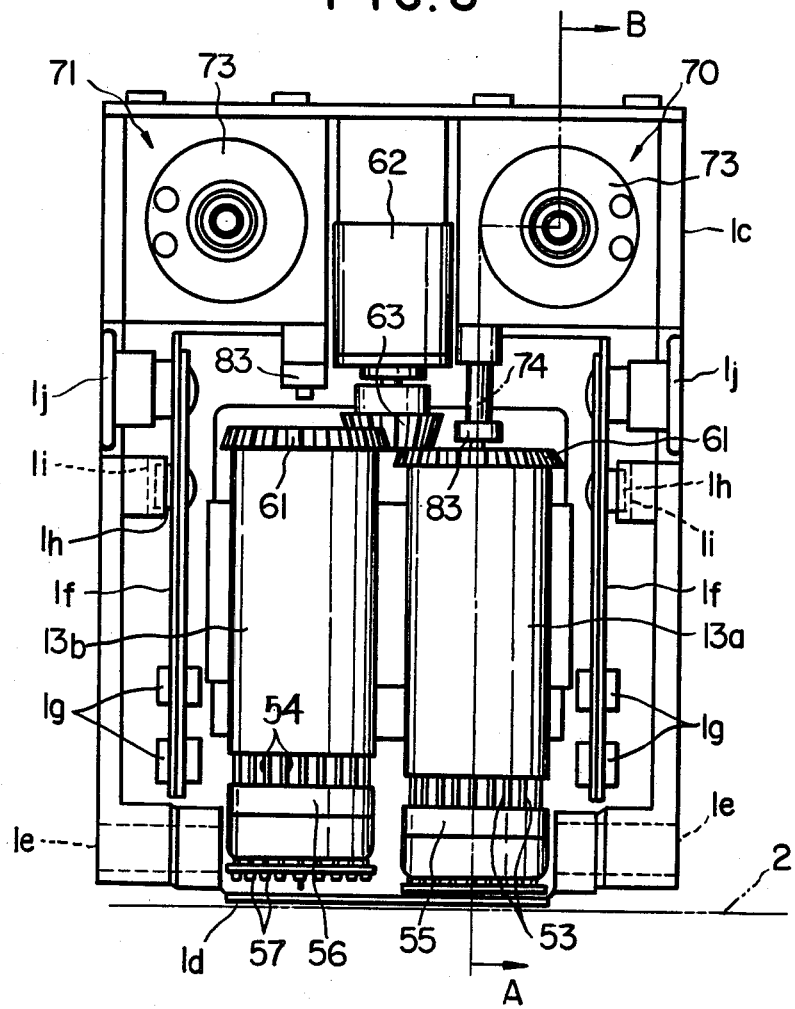
FIG. 8 is a front view of another embodiment of the lead device of this invention.
Figure 10:
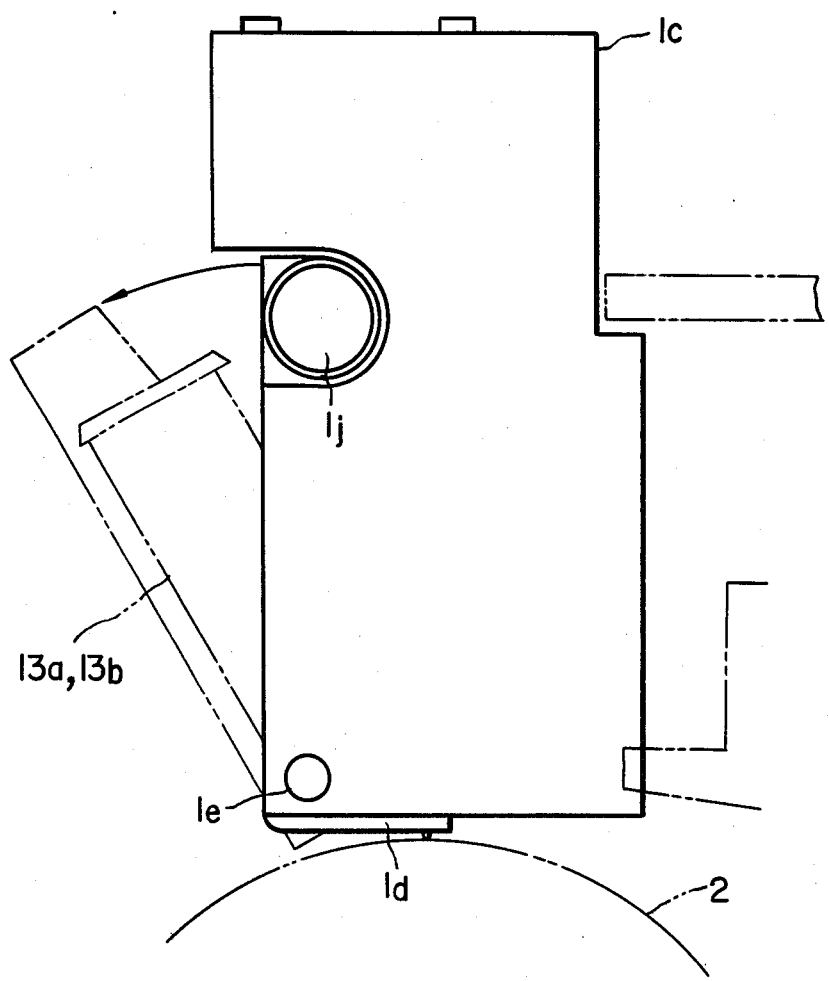
FIG. 10 is a side view of the device shown in FIG. 8.
Figure 11:
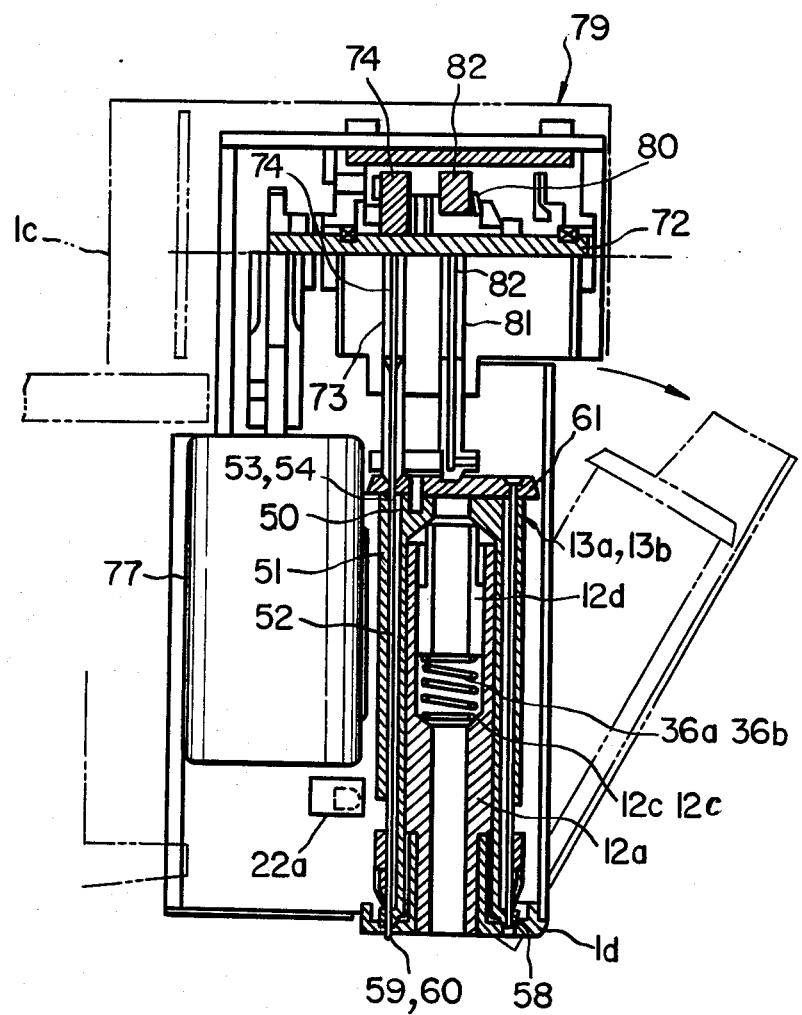
FIG. 11 is a sectional view along a vertical plane of the device shown in FIG. 8.

As shown in FIGS. 8, 11 and 12, bottom plate 1d is pivotally supported at the lower part of frame 1c by shaft 1e, 1e so as to rotate upwardly from a horizontal plane. A pair of plate springs 1f,1f are fixed to bottom plate 1d at opposite sides by rivets 1g,1g. Plate springs 1f,1f extend upwardly and have pins 1h,1h provided on said frame 1c in the horizontal portion of said bottom plate 1d. These plate springs have buttons 1g,1g at upper ends to release engagement between pins 1h,1h and depressions 1i,1i. Paper 2 is shown in FIG. 10.

As shown in FIG. 11, a pair of cylindrical shafts 12a,12a are vertically positioned on bottom plate 1a and turret sleeves 13a,13b are rotatably mounted on shafts 12a,12a and are slidable up and down. Turret sleeves 13a,13b are biased upwardly by compressed springs 36a,36b which inserted in said cylindrical shafts 12a,12b between seats 12c,12c and insert 12d inserted into the cavity of the cylindrical shaft with its upper end in contact with turret sleeve 13a,13b.

Figure 9:
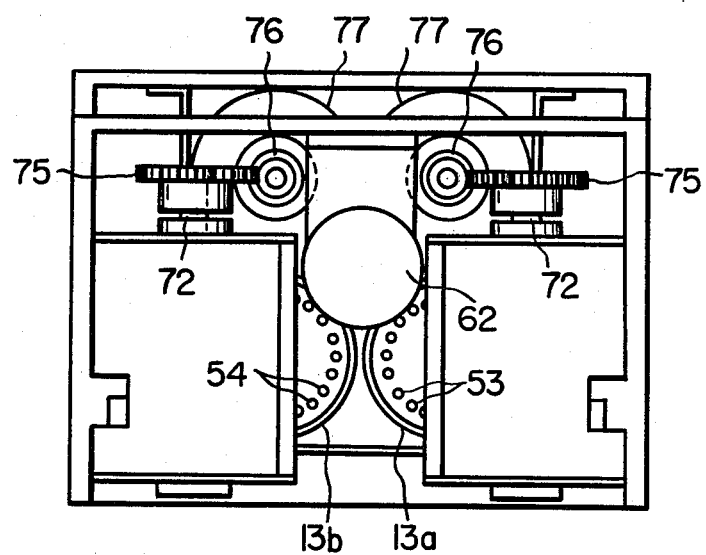
FIG. 9 is a plane view of the device shown in FIG. 8.

As shown in FIG. 11 turret sleeves 13a,13b consists of inner sleeve 50 and outer sleeve 51 respectively with longitudinal recesses 52,52, . . . in equal angular spaced relation formed between said inner sleeve 50 and outer sleeve 51. Lead bars 53,53, . . . ; 54,54, . . . of approximate thickness 0.5 mm and 0.3 mm respectively are inserted into said longitudinal recesses. Outer sleeves 51, 51, . . . have a removed portion and rubber bands in frictional contact with said lead bars 53,53, . . . 54,54, . . . are wound on the removed portion. As shown in FIG. 9, a plurality of conical projections 57,57, . . . are provided at the lower face of said turret sleeves 13a,13b just beneath the longitudinal recesses 52,52, . . . As shown in FIG. 11 a plurality of depressions 58,58, . . . in which said projections 57,57, . . . will fit are provided on the upper face of bottom plate 1d and one of said depressions 58,58 most closest to the center have through holes 59,60 for projection of the lower end of a lead bar 53,54. A pair of bevel gears 61,61 are formed at the upper periphery of said turret sleeves 13a,13b.

A motor 62 for rotating said turret sleeves 13a,13b is secured on frame 1c facing downward with bevel gear 63 meshing with said bevel gears 61,61 fixed on the lower end of the shaft of said motor 62. For detection the alignment of a lead bar 53,54 through holes 59,60 a photosensing device 22a such as a phototransistor and a photoconductive element is provided on the lower part of frame 1c, and motor 62 is controlled by the output signal of photosensing device 22a.

At frame 1c, a pair of lead bar pressing devices 70,71 are provided for pressing lead bar 53,54 in said turret sleeve 13a,13b downwardly. Devices 70,71 are symmetrical and the description of one will apply equally to the other. In device 70,71, a pair of shafts 73,73 are horizontally supported just above said turret sleeve 13a,13b. A pair of capstan wheels 73,73 are fixed on shaft 72,72, wires 74,74 are wound around capstan wheel 73,73 and one end of wires 74,74 are fixed on capstan wheels 73,73. The other ends of wire 74,74 are positioned in opposition to the upper ends of one of said lead bar 53,54 which are positioned slightly above through hole 59,60. Shafts 72,72 are connected to motor 77,77 via worm driven wheel 75,75 and worm gear 76,76. Turret press device 79 (i.e., secondary capstan wheels 81,81) is fitted on said shaft 72,72 through friction force (i.e., friction clutch 80,80). Wires 82,82 are wound on capstan wheel 81,81 and the ends of wire 82,82 are secured to capstan wheel 81,81. Heads 83,83 fixed on the other ends of wire 81,81 are opposed against the center of upper face of turret sleeves 13a,13b.

The operation of the above embodiment is as follows: By pressing buttons 1j,1j at opposite sides of the device, pins 1h,1h, recede from depressions 1i,1i, so that bottom plate 1d can rotate upwardly as shown in the dotted lines of FIGS. 10 and 11. In this state it is possible to replace turret sleeves 13a,13b with new lead bars 53,54 by pulling them upwardly from cylindrical shaft 12a,12b.

After replacement of turret sleeves 13a,13b, the bottom plate is rotated downwardly to a horizontal state, and release the buttons 1j,1j, pins 1h,1h engage again with depressions 1i,1i, by the resilient force of plate springs 1f,1f. In this state, turret sleeve 13a,13b returns to the state shown in solid lines in the FIGS. and bevel gear 61,61 engages with bevel gear 63.

As shown in FIG. 8, the turret sleeve 13a is lowered against the resilient force of spring 36a, and bevel gear 61 does not engage bevel gear 63. Bevel gear 61 of turret sleeve 13b engages the turret sleeve in a controlled direction. If both of turret sleeves 13a,13b engage the bevel gear 63, one of the turret sleeves is controlled and the other turret sleeve is idling.

Upon the rotation of motor 62, turret sleeve 13b rotates through bevel gear 63,61. When one lead bar 54 reaches a position just above through hole 60, photo-sensing device 22a generates a signal which stops motor 62.

Figure 13:
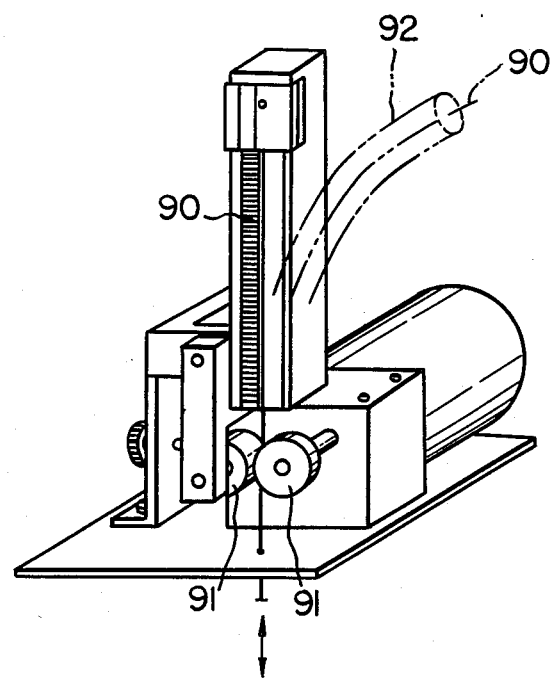
FIG. 13 is a perspective view of a part of the device according to another embodiment of this invention.

Motor 77 of lead bar pressing device 71 then rotates via worm gear 76 and worm driven wheel 75, capstan wheel 73 and shaft 72 rotates in clockwise direction as shown in FIG. 13. Wire 74 extends from capstan wheel 73, until its lower end presses lead bar 54 positioned just above the through hole 60 downwardly. On the other hand, capstan wheel 81 rotates in the same direction through frictional force, head 83 lowers and presses the sleeve of turret 13b downwardly against the resilient force of spring 36b. By this movement, projections 57,57 . . . at the lower face of turret sleeve 13b fit into depressions 58,58, . . . and the direction of the turret 13b is positioned accurately. After completion of the lowering movement of the sleeve of turret 13b, capstan wheel 81 and wire 82, head 83 stop and friction clutch 80 slips.

Lead bar 54 then protrudes through hole 60 into contact with paper 2 and motor 76 stops.

Hereafter, motor 47 rotates by small amounts according to wearing on lead bar 54 and pushes it downwardly.

When a separation between lead bar 57 and paper 2 is desired, motor 47 rotates in a reverse direction by a small amount. This causes capstan wheel 73 and capstan wheel 81 through friction clutch 80 to rotate in a counter clockwise direction by a small amount, wires 74 and 82 retract, and head 83 moves upwardly. The lower end of lead bar 54 and turret 13b rise a small extent due to the resilient force of spring 36b and separate from paper 2.

When the effective length of a lead bar 54 is consumed, motor 77 and capstan wheel 73 rotate in reverse direction. Thereby wires 74 or 82 are retracted, head 83 rises and turret sleeve 13b rises upwardly because of the resilient force of spring 36b until its bevel gear 61 meshes with bevel gear 63 and the lower end of the lead bar 54 recedes from through hole 60 completely. In this case friction clutch 80 also slips.

Motor 62 then rotates, and turret 13b rotates via bevel gear 63,61. Thus, the next new lead bar 54 is positioned just above through hole 60, photosensing device 22a detects lead bar 54, motor 62 stops because of the signal and an operation similar to that thereinbefore described is repeated and a new lead bar 54 is ready for use.

The operation of lead bar pressing device 70 is substantially similar to that of lead bar pressing device 71, causing lead bars 53,53, . . . to sequentially project through hole 59, and be used.

Figure 14:
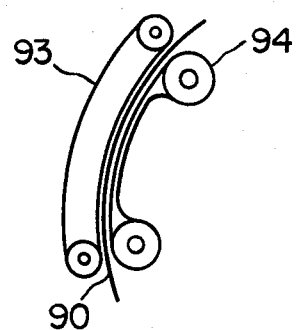
FIG. 14 is a side view of the path of wire of the device according to still another embodiment of this invention.

In the above mentioned embodiment, wire 74 of lead bar pressing device 70,71 and wire 82 of turret pressing device 79 are wound on capstan wheel 73,81. However as shown in FIG. 13, a straight wire 90 driven by a pair of nip rollers which grip the lower part of wire 90 can be used. As shown in dotted lines in FIG. 13, wire 90 may be retracted into curved tube 92 or along a curved path by belts 93,94 as shown in FIG. 14 to reduce the height of the device.

In the above mentioned embodiment, the turret pressing device is actuated by a lead bar pressing device through a friction clutch so that the driving mechanism is greatly simplified. In this embodiment, the turret is pressed by a wire and a head but another mechanism such as a press bar, press lever or arm connected to a lead bar pressing mechanism through friction force can be substituted.

This invention is not to be limited by the embodiments shown in the drawings and described in the description, which are given by way of example and not of limitation, but only in accordance with the scope of the appended claims.

I claim:

1. A lead feed device for a drawing machine in which a turret drum is rotatably and slidably mounted on a shaft mounted on a bottom plate and lead bars are inserted in longitudinal recesses in said turret drum, a lead bar pressing device provided above said turret drum, said lead bar pressing device comprising a rotatable disc on which a wire for pressing said lead bar is wound, one end of said wire abutting against one end of said lead bar in said turret drum.

2. A lead feeding device for a drawing machine as claimed in claim 1, in which a bore is provided on said bottom plate for receiving a projected lead bar, said turret drum being slidable along a stroke which is longer than the length of said bore.

3. A turret drum for said lead feeding device as claimed in claim 1, in which the turret drum consists of inner sleeve and an outer sleeve, said longitudinal recesses for receiving lead bars being provided between said inner sleeve and said outer sleeve, a portion of said outer sleeve being removed so as to expose a portion said lead bars, and friction band means being wound on removed portion of said outer sleeve.

4. A lead device for drawing machine as claimed in claim 1, in which a lead bar pressing device is provided above said turret drum, said lead bar pressing device comprising a wire, said wire being driven up and down by a pair of nip rollers, a lower end of said wire or bar abutting against an upper end of said lead bar.

5. A device for feeding lead in a drawing machine comprising;
   a cylindrical turret drum having a plurality of peripheral longitudinal recesses, said longitudinal recesses each having a bar of lead;
   mounting means mounting said cylindrical turret drum for rotational and slidable movement about an axis;
   lead bar press means at one end of said cylindrical turret drum for selectively pressing on the end of one of said lead bars for extending said selected bar from the other end of said cylindrical turret drum;
   said lead bar press means comprising a rotatable disc, a wire wound on said rotatable disc with a free end of said wire abutting the end of said selected lead bar;

drive means for driving said rotatable disc to advance said lead bar as it wears.

6. The device according to claim 5 in which said mounting means comprises;
a bottom plate;
a shaft mounted on said bottom plate, said cylindrical turret drum being mounted on said shaft;
a bore in said bottom plate through which said selected lead bar is extended by said press means.

7. The device according to claim 6 in which said cylindrical turret drum is slidably mounted on said shaft to have a stroke which is longer than the length of said bore.

8. The device according to claim 7 in which said cylindrical turret drum is comprised of a pair of concentric cylindrical sleeves; said longitudinal recesses being provided between said cylindrical sleeves.

9. The device according to claim 8 in which a portion of the outer sleeve of said pair of cylindrical sleeves at the end from which said lead bars are extended is removed; and frictional retaining means being wound about said pair of concentric cylindrical sleeves at the removed portion; whereby said lead bars are frictionally retained in said longitudinal recesses.

10. The device according to claim 9 in which said drive means for said rotatable disc comprises; a pair of driven rollers forming a nip, said free end of said wire extending through said nip; whereby said wire is extended or retracted by rotation of said rollers forming said nip.

11. The device according to claim 10 including cylindrical turret drum press means for slidably advancing the turret drum when said lead bar press means extends a lead bar through said bore.

12. The device according to claim 10 including means for calibrating the length to which said wire in said lead bar press means is extended.

13. The device according to claim 12 including means for rotating said cylindrical turret drum to sequentially select lead bars positioned in said longitudinal recess.

* * * * *